United States Patent
Møller et al.

(10) Patent No.: US 11,936,188 B2
(45) Date of Patent: Mar. 19, 2024

(54) HYBRID POWER PLANT AND A METHOD FOR CONTROLLING A HYBRID POWER PLANT

(71) Applicant: VESTAS WIND SYSTEMS A/S, Aarhus N (DK)

(72) Inventors: Henrik Møller, Egå (DK); Mads Rajczyk Skjelmose, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 346 days.

(21) Appl. No.: 17/278,128

(22) PCT Filed: Sep. 10, 2019

(86) PCT No.: PCT/DK2019/050265
§ 371 (c)(1),
(2) Date: Mar. 19, 2021

(87) PCT Pub. No.: WO2020/057702
PCT Pub. Date: Mar. 26, 2020

(65) Prior Publication Data
US 2021/0336443 A1    Oct. 28, 2021

(30) Foreign Application Priority Data
Sep. 19, 2018 (DK) .................. 2018 70611

(51) Int. Cl.
*H02J 3/38* (2006.01)
*H02J 3/46* (2006.01)

(52) U.S. Cl.
CPC ............ *H02J 3/381* (2013.01); *H02J 3/46* (2013.01); *H02J 2300/24* (2020.01); *H02J 2300/28* (2020.01)

(58) Field of Classification Search
CPC .......... H02J 3/381; H02J 3/46; H02J 2300/24; H02J 2300/28; H02J 2300/40; H02J 3/48;
(Continued)

(56) References Cited

U.S. PATENT DOCUMENTS 9,645,596 B1  5/2017 Lee et al.
2012/0289224 A1* 11/2012 Hallberg ........... H04W 52/0206
455/424
(Continued)

FOREIGN PATENT DOCUMENTS

EP        2921698 A1     9/2015
JP    2009104833 A  *    5/2009
(Continued)

OTHER PUBLICATIONS

European Patent Office, Communication pursuant to Article 94(3) EPC for Application 19 768 712.2-1202 dated Jun. 22, 2022.
(Continued)

*Primary Examiner* — Charles Cai
(74) *Attorney, Agent, or Firm* — Patterson + Sheridan, LLP

(57) ABSTRACT

The invention relates to a hybrid power plant for producing power to the electrical grid, the hybrid power plant comprising a plurality of energy assets; a first renewable power generating unit, such as wind turbine generators, a second renewable power generating unit, such as a plurality of solar power units, and an energy storage unit, such as a battery energy storage system. A power plant controller is arranged to perform a first comparison of an active power reference with an available power from the first and the second renewable power generating units and performing a second comparison of available charging, or discharging, capability of the energy storage unit with said first comparison. In response to this first comparison, set points are distributed to
(Continued)

the first and the second renewable power generating units so as to deliver power from the hybrid power plant in accordance with the received active power reference.

18 Claims, 13 Drawing Sheets

(58) Field of Classification Search
CPC .. H02J 3/32; Y02E 10/56; Y02E 10/76; Y02E 20/16; Y02E 70/30; Y02E 40/10
See application file for complete search history.

(56) References Cited

U.S. PATENT DOCUMENTS

| | | | | |
|---|---|---|---|---|
| 2012/0323396 | A1* | 12/2012 | Shelton | H02M 7/44 700/297 |
| 2015/0381089 | A1 | 12/2015 | Tarnowski et al. | |
| 2016/0226254 | A1* | 8/2016 | Cheng | H02J 3/40 |
| 2016/0313716 | A1 | 10/2016 | Chen et al. | |
| 2017/0005470 | A1 | 1/2017 | Wagoner et al. | |
| 2017/0104336 | A1 | 4/2017 | ElBsat et al. | |
| 2017/0358929 | A1 | 12/2017 | Koeppe et al. | |
| 2018/0370522 | A1* | 12/2018 | Collins | B60W 10/08 |

FOREIGN PATENT DOCUMENTS

| | | |
|---|---|---|
| KR | 20170129456 A | 11/2017 |
| WO | 2017114527 A1 | 7/2017 |
| WO | 2020057702 A1 | 3/2020 |

OTHER PUBLICATIONS

Danish Patent and Trademark Office 1st Technical Examination for Application No. PA 2018 70611 dated Mar. 29, 2019.

PCT Notification of the Transmittal of the International Search Report and the Written Opinion of the International Searching Authority, or the Declaration for Application No. PCT/DK2019/050265 dated Nov. 29, 2019.

European Patent Office, Communication Pursuant to Article 94(3) EPC for Application 19 768 712.2-1202 dated Jul. 27, 2023.

* cited by examiner

HYBRID POWER PLANT AND A METHOD FOR CONTROLLING A HYBRID POWER PLANT

FIELD OF THE INVENTION

The present invention relates to a hybrid power plant with a plurality of energy assets comprising several renewable power generating units, including a first renewable power generating unit comprising a plurality of first wind turbine generators and a second renewable power generating unit preferably comprising solar power units, and an energy storage unit, such as a large battery. The invention also relates to a corresponding method, a corresponding controller, and a corresponding computer program product to implement the present invention.

BACKGROUND OF THE INVENTION

Recently, various kinds of renewable energy are gaining increased success in countries around the world to produce electricity for the local electrical grid due to the gradual transition to a non-fossil based energy system taking place, but electrical grids also have requirements for such an integration of renewable energy to be effective.

For example, the high penetration of wind turbines, or wind turbine generators (WTG), in the electrical grids has motivated requirements for the wind turbine generators on how they should contribute to the stability of the electrical grids. Such requirements are included in so-called grid codes defined by the transmission system operator (TSO), which the wind power plants, sometimes called wind farms, must comply with for producing power to the electrical grid.

Recently, there is an emerging trend to integrate various renewable energy sources into a so-called hybrid power plant with a plurality of energy assets i.e. with several power generating units, such as wind turbines generators and solar power units, together with an energy storage system, such as a large battery. Expectations are set at a high reliability of power produced from a hybrid power plant because of the possible complementary nature of the local wind and solar sources of energy, e.g. the sun may not be shining in the evening, when the winds are relatively strong.

Some of the requirements, which may be included in the grid codes, include maintaining a certain delivered power, voltage and frequency, and possibly having certain limits for the rate of changes of such parameters, e.g. so-called ramp rates. These requirements are expectantly also imposed on future hybrid power plants, and it is therefore important to be able to deliver energy according to the grid codes for such hybrid power plants, too.

Additionally, there are new challenges with integrating of various power generating sources, e.g. wind energy and solar energy, because of their dissimilar characteristics, especially their response to changing conditions and requirements. Overall, it is also an overriding aim to produce the maximum allowed amount of energy, which may be somewhat challenging considering the various power generating sources and their different energy production qualities, e.g. stability over time, control over distances within the hybrid power plant, response to changes, etc.

Hence, an improved hybrid power plant would be advantageous, and in particular a more efficient and/or reliable hybrid power plant would be advantageous.

OBJECT OF THE INVENTION

It is a further object of the present invention to provide an alternative to the prior art.

In particular, it may be seen as an object of the present invention to provide a hybrid power plant that solves the above mentioned problems of the prior art with producing power in compliance with grid codes, especially upon changing of certain parameters, while at the same time optimizing energy production.

SUMMARY OF THE INVENTION

Thus, the above described object and several other objects are intended to be obtained in a first aspect of the invention by providing a hybrid power plant connected to an associated electrical grid for producing power to said electrical grid, the hybrid power plant comprising a plurality of energy assets, the plurality of energy assets comprising:

a first renewable power generating unit, said first renewable power generating unit comprises a plurality of wind turbine generators, a second renewable power generating unit, wherein the second renewable power generating unit being different from first renewable power generating unit, preferably said second renewable power generating unit comprises a plurality of solar power units, and an energy storage unit, preferably a battery energy storage system, said energy storage unit being capable of storing energy from said first and second renewable power generating units, and delivering power to said electrical grid when required, wherein the hybrid power plant further comprises a power plant controller arranged to communicate with the plurality of energy assets, the power plant controller being arranged for receiving an active power reference and perform a first comparison of said active power reference with an available power from said first renewable power generating unit and said second renewable power generating unit, and performing a second comparison of available charging, or discharging, capability of the energy storage unit with said first comparison, and distributing a corresponding set point to said energy storage unit, and the power plant controller further being arranged, in response to said first comparison, for distributing set points to said first renewable power generating unit and said second renewable power generating unit, respectively, so as to deliver power from the hybrid power plant in accordance with the received active power reference.

The invention is particularly advantageous for obtaining a hybrid power plant with different renewable power generating unit by splitting the active power reference on a continuous basis between the different sources with fluctuating capabilities, and thereby keep a stable power output from the hybrid power plant. Thus, simulations performed by the current inventors indicate that a stable and fast responding power plant can be obtained while at the same time optimising the power production. With respect to the power production, the simulations show that an improvement of several percent higher power production may in certain situations result from implementing the present invention. Another advantage by the invention is to use the power generating units to the maximum extent possible and only use the battery when needed. Thus, ensuring that the hybrid power plant do not curtail power generating units, if not required by external reference.

In the context of the present invention, the term 'hybrid power plant' will be broadly understood as a power plant capable of producing power for the electric grid based on several sources of energy, including, but not limited to, wind energy, solar energy, hydro energy, thermal energy, etc., in the sense that the hybrid power plant has a mixture of energy sources producing power. It is to be understood that the hybrid power plant will be controlled collectively at some overall level of control to produce power, which—in the present context is called a power plant controller (PCC). The various energy assets may, additionally or alternatively, have some degree of local control, e.g. a slave controller. It is also to be understood that the hybrid power plant may have a large geographical extent, e.g. the plurality of energy assets may be scattered at several locations, for example up to 2, 5, 10, 15 or 20 km, or even longer, apart, as long as the power plant controller is capable of provide some degree of overall level of control according to the present invention, especially considering electrical losses and/or control and measurement delays.

In the context of the present invention, the first renewable power generating unit comprises a plurality of wind turbines generators, each wind turbine generator (WTG) may comprise a tower and a rotor with at least one rotor blade, such as three blades. The rotor may be connected to a nacelle, which is mounted on top of the tower and being adapted to drive a generator situated inside the nacelle. The rotor is rotatable by action of the wind. The wind induced rotational energy of the rotor blades is transferred via a shaft to the generator. Thus, the wind turbine generator is capable of converting kinetic energy of the wind into mechanical energy by means of the rotor blades and, subsequently, into electric power by means of the generator. The generator may include a power converter for converting the generator AC power into a DC power and a power inverter for converting the DC power into an AC power to be injected into the electrical power grid. The plurality of wind turbine generators may different, or they may be of the same kind.

In the context of the present invention, the second renewable power generating unit may comprise a plurality of solar power units, which each solar power unit may have e.g. a photovoltaic (PV) solar panel, a concentrated solar power (CSP) unit, or other solar power units capable of utilising the solar radiation and converting it to electrical power.

In the context of the present invention, the energy storage unit is to be understood broadly as a unit capable of storing energy from the first and/or second renewable power generating units generating power during period of surplus energy, and then store the energy for some period of time until the need arise for the energy to be supplied into the electrical grid.

In general, the energy storage unit may be used to store energy from the grid as well, in periods when energy is cheap and release it to the grid when energy is expensive. This is known as "Energy Arbitrage". Thus, it will be understood that for a hybrid power plant to rely on the energy storage unit, the stored energy may be of a certain minimum size to be of any significant use at a later time. Thus, it is considered that a minimum amount of energy of 0.5 MWh, 1 MWh, 2 MWh, 3 MWh, 4 MWh, or 5 MWh, is to be stored by the energy storage unit. Similarly, the power supplied to the electrical grid may be capable of a certain minimum power, for example at least 0.5 MW, 1 MW, 2MW, 3MW, 4MW, or 5MW, to have an impact on the hybrid power plant complying with the relevant grid codes for power production. Alternatively, the ratio of the energy storage unit power to the total power of the hybrid power plant may be minimum 1%, 2%, 3%, 4% or 5% to have an impact on the electrical grid. Alternatively, the ratio of the energy storage unit power to the total power of the hybrid power plant may be maximum of 20%, 15%, 10%, 8%, 6%, 4% or 2% because the energy storage unit is typically the most expensive energy asset, either at a given moment or averaged over some period of time, Suitable energy storage units may preferably be based on electrochemical storage, such as a battery energy storage system (BES), more preferably including rechargeable Lithium ion batteries (LIB), but other energy storage units are also contemplated within the present invention, for example based on mechanical storage (e.g. compressed air reservoirs), electrical storage (e.g. so-called supercapacitors), thermal energy storage, or chemical energy storage (e.g. power-to-gas PWG), or other energy storage means suitable for power plant energy storage and subsequent power delivery to the electrical grid.

In the context of the present invention, the capability of charging, or discharging, of the energy storage unit should be interpreted broadly as a common measure of the amount of charge, and thereby energy, stored in the energy storage unit, and/or the rate of discharge, or charge, typically the effect of the storage unit, e.g. energy/time. Notice, that the rate of discharge, or charge, of an energy storage unit, e.g. a battery, can be dynamic in the sense that it varies over time as a function of state of charge (SoC), maximum limits, user defined limits, etc. Typically, the state of charge (SoC) is measured relatively as a percentage of the total capability, but other measures, such depth of discharge (DoD) being the inverse of SoC can be used. It is to be understood that the energy storage unit in the context of present typically has a relatively high capability of energy storage in order to have a significant impact on an electrical grid, and therefore the rate of discharge, or charge, and/or the state of charge (SoC) of the energy storage unit could be a combined or collective measure for a plurality of dispersed energy storage units, e.g, a plurality of BESs, different or similar or identical BESs, as the skilled person in energy storage will readily understand.

In the context of the present invention, the first and second renewable power generating units and the energy storage unit may be defined collectively as energy assets. In an embodiment, yet other energy assets could cooperate with the said energy assets of the present invention, especially energy assets based on fossil fuels (carbon based), such power generating unit being based on oil, coal, hydrocarbon gas etc. In this technical field, the energy assets may also be referred to as 'energy actuators', as the skilled person will readily understand. The two terms will be interchangeably used below in the detailed description.

Likewise, in the context of the present invention, a first of the energy assets may be considered as the first renewable power generating unit. The first renewable power generating unit may then in turn comprise a plurality of wind turbine generators (WTGs). These wind turbine generators may then again have shared or common characteristics, for example a plurality of very similar or identical wind turbine generators in a large wind turbine array or wind farm. Similarly, a second of the energy assets may be considered as the second renewable power generating unit. The second renewable power generating unit may then in turn comprise a plurality of solar power units. These solar power units may then again have shared or common characteristics, for example a plurality of very similar or identical solar power unit, e.g. PV units, in a large solar array.

Available power is to be understood as the power which the renewable power generating unit is able to produce. The available power may change over time. For a wind turbine generator, it may depend on the wind speed and/or direction and for a solar power unit, it may be dependent on the solar irradiance.

In one embodiment, when the first comparison of said active power reference with the available power results in said active power reference being larger than the available power, which may indicate a lack of power, the power plant controller, depending on the second comparison, is arranged for distributing a corresponding set point to the energy storage unit for, at least partly, compensating said lack of power by discharging the energy storage unit.

In another related embodiment, said second comparison may indicate that the available charging, or discharging, capability from the energy storage unit is sufficient for compensating the lack of power indicated by the first comparison, and the power plant controller being arranged for distributing a corresponding set point to said energy storage unit and thereby produced the required power in an advantageous manner.

In yet another embodiment, wherein in response to said second comparison indicating that the available charging, or discharging, capability from the energy storage unit is not sufficient for compensating the lack of power indicated by the first comparison, the power plant controller is arranged for distributing a corresponding set point to said energy storage unit for compensating the lack of power to an extent possible by the available charging, or discharging, capability.

In one embodiment, the power plant controller may further be arranged for distributing set points to said first renewable power generating unit and/or said second renewable power generating unit, respectively, being above the otherwise indicated available power from said first renewable power generating unit and said second renewable power generating unit. Thus, the present invention is particularly advantageous in that the renewable power generating units can produce a level more of power than otherwise expected, the reason being the available power is difficult to estimate or measure reliably because of the inherent instability of sun and wind. Simulations show an expected gain of some percent, which is a significant result. Thus, whereas modern control loops have response times at the level of milliseconds, the available power from renewable power generating units may be several seconds delayed. It is of course to be understood that the safety limits of the renewable power generating units should be respected and not overruled even though the set point may be set above the otherwise indicated available power.

In one particularly advantageous embodiment, the hybrid power plant may have the set points above the indicated available power being independent of said second comparison.

In another particularly advantageous embodiment the set points to said first renewable power generating unit and/or said second renewable power generating unit, respectively, may be equal to the active power reference. In other embodiments, the set point be set 10%, 20%, or 30% etc. above the active power reference but still of course respecting safety limits for the renewable power generating units. In some variants, there may also be redistributing between energy assets of wind turbine generators and solar power unit and during a situation where they are to perform over there available limits. Various control loop, feedback or forward, may over time try to optimise this further as the skilled person will understand.

In another embodiment, when said first comparison of said active power reference with the available power results in said active power reference being smaller than the available power indicating an excess of power, the power plant controller, depending on the second comparison, may be arranged for distributing a corresponding set point_to the energy storage unit for charging the energy storage unit to the extent possible to reuse the energy at a later time.

In another related embodiment, the power plant controller (PPC), depending on the second comparison, may be arranged for distributing a corresponding set point to the energy storage unit for charging the energy storage unit with a full, or a partly, charging capability of the energy storage unit, and for distributing corresponding set points to said first renewable power generating unit and said second renewable power generating unit, respectively.

In another embodiment, the power plant controller (PPC) may be further arranged, in response to said second comparison, for distributing set points to said first renewable power generating unit and said second renewable power generating unit, respectively, so as to deliver power from the hybrid power plant in accordance with the received active power reference, i.e. in an excess power situation, the set points to the renewable power generating units may also be dependent on the second comparison.

In some embodiments, the active power reference, preferably from a transmission system operator (TSO), and, using a hybrid active power controller, may calculate a hybrid power plant reference based on a desired mode of operation of the hybrid power plant, and the power plant controller being arranged for performing said first comparison of the said hybrid power plant reference with an available power from said first renewable power generating unit and said second renewable power generating unit. Thus, be transforming to the local hybrid power plant reference more improved control may be performed, In some embodiments, the available power from said first renewable power generating unit and/or said second renewable power generating unit may be, at least partly, based on a meteorological condition and/or forecast including a wind condition and/or forecast for the said first renewable power generating unit, and preferably a solar condition and/or forecast from the said second renewable power generating unit to yield even more precise forecast about the available power. Alternatively or additionally, the available power may include elements or characteristics from previous measurements or the history of measurements in the same location and/or similar situation.

In some embodiments, the hybrid power plant may further comprise:
  a module for deriving an estimated value for electrical losses in the hybrid power plant;
  a module for deriving a measured value for electrical losses in the hybrid power plant, based on a difference between an aggregated power production from the plurality of energy assets and a power measurement at a point of common coupling (PoC), and
  a regulator arranged to apply the estimated value for electrical losses and the measured value for electrical losses in an active power control loop in the power plant controller, the active power control loop being arranged to control an active power production of the hybrid power plant at the point of common coupling,
wherein the available power from said first renewable power generating unit and/or said second renewable power generating unit is calculated using said regulator. Thus, if estimates of power may differ from actual measurements for example due to electrical losses, this embodiment may compensate and/or reduce this resulting in even better values for the available power.

In a second aspect, the invention relates to a method for controlling a hybrid power plant, the hybrid power plant being connected to an electrical grid for producing power to said electrical grid, the hybrid power plant comprising a plurality of energy assets, the plurality of energy assets comprising:

a first renewable power generating unit, said first renewable power generating unit comprises a plurality of wind turbine generators, a second renewable power generating unit, wherein the second renewable power generating unit being different from first renewable power generating unit, preferably said second renewable power generating unit comprises a plurality of solar power units, and an energy storage unit, preferably a battery energy storage system, said energy storage unit being capable of storing energy from said first and second renewable power generating units, and delivering power to said electrical grid when required, wherein the method comprises:

controlling a power plant controller (PPC) to communicate with the plurality of energy assets, the power plant controller being arranged for receiving an active power reference, performing a first comparison of said active power reference with an available power from said first renewable power generating unit and said second renewable power generating unit, performing a second comparison of available charging, or discharging, capability of the energy storage unit with said first comparison, and distributing a corresponding set point to said energy storage unit, and distributing set points to said first renewable power generating unit and said second renewable power generating unit, respectively, in response to said first comparison, so as to deliver power from the hybrid power plant in accordance with the received active power reference.

In a third aspect, the invention relates to a power plant controller (PPC) for controlling an associated hybrid power plant connected to an associated electrical grid for producing power to said electrical grid, the hybrid power plant comprising a plurality of energy assets, the plurality of energy assets comprising:

a first renewable power generating unit, said first renewable power generating unit comprises a plurality of wind turbine generators, a second renewable power generating unit, wherein the second renewable power generating unit being different from first renewable power generating unit, preferably said second renewable power generating unit comprises a plurality of solar power units, and an energy storage unit, preferably a battery energy storage system, said energy storage unit being capable of storing energy from said first and second renewable power generating units, and delivering power to said electrical grid when required, wherein the power plant controller is arranged to communicate with the plurality of energy assets, the power plant controller being arranged for receiving an active power reference and perform a first comparison of said active power reference with an available power from said first renewable power generating unit and said second renewable power generating unit, and performing a second comparison of available charging, or discharging, capability of the energy storage unit with said first comparison, and distributing a corresponding set point to said energy storage unit, and the power plant controller further being arranged, in response to said first comparison, for distributing set points to said first renewable power generating unit and said second renewable power generating unit, respectively, so as to deliver power from the hybrid power plant in accordance with the received active power reference.

In a fourth aspect, the invention relates to a computer program product being adapted to enable a computer system comprising at least one computer having data storage means in connection therewith to control a hybrid power plant according to the first and/or second aspect of the invention.

This aspect of the invention is particularly, but not exclusively, advantageous in that the present invention may be accomplished by a computer program product enabling a computer system to carry out the operations of the second aspect of the invention when down- or uploaded into the computer system.

In yet another aspect, the invention relates to a data storage medium whereupon such a computer program product may be provided, i.e. on any kind of computer readable medium, or through a network.

The individual aspects of the present invention may each be combined with any of the other aspects. These and other aspects of the invention will be apparent from 15 the following description with reference to the described embodiments.

BRIEF DESCRIPTION OF THE FIGURES

The present invention will now be described in more detail with regard to the accompanying figures. The figures show one way of implementing the present invention and is not to be construed as being limiting to other possible embodiments falling within the scope of the attached claim set.

DETAILED DESCRIPTION OF AN EMBODIMENT

Figure 1:
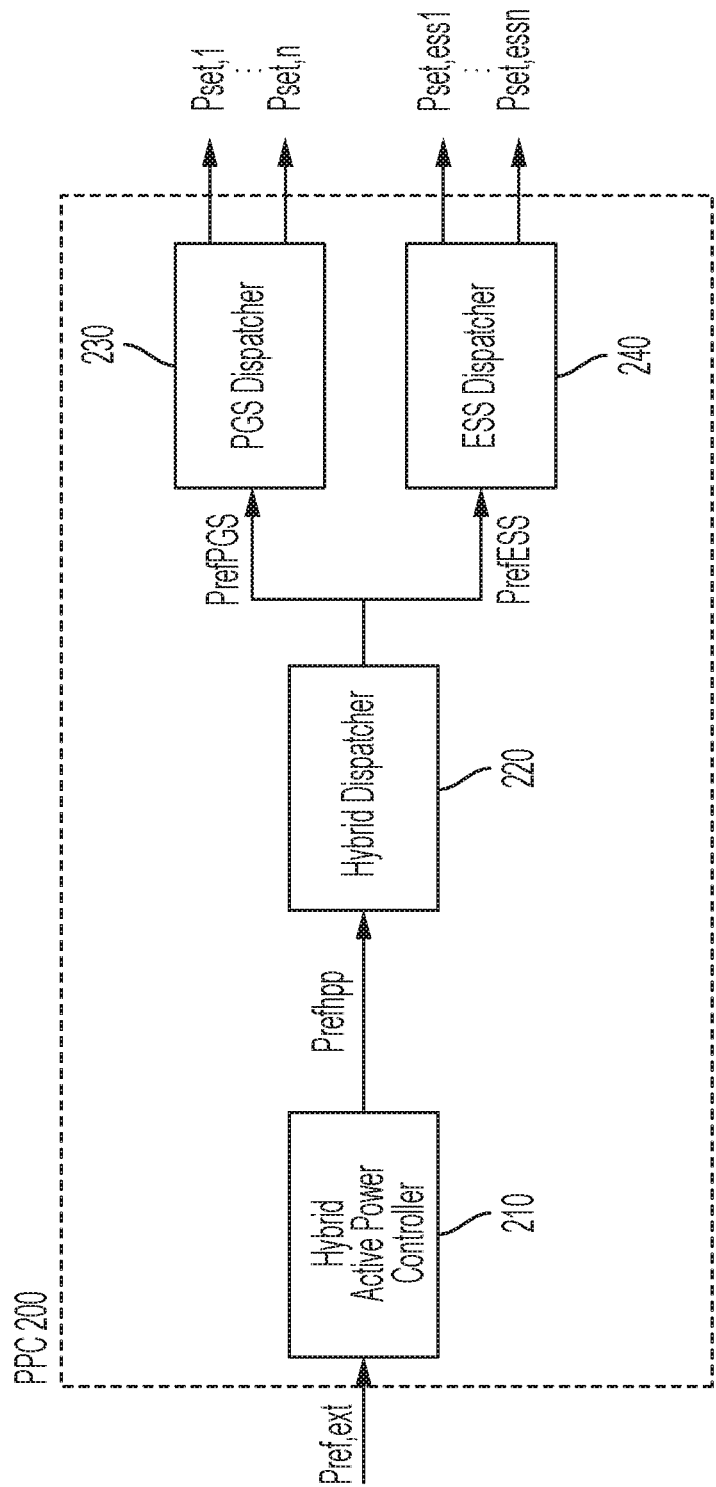
FIG. 1 is a simplified schematic drawing of power plant controller of the hybrid power plant according to an embodiment of the present invention.

FIG. 1 is a simplified schematic drawing of power plant controller (PPC) 200 of the hybrid power plant according to an embodiment of the present invention.

Figure 3:
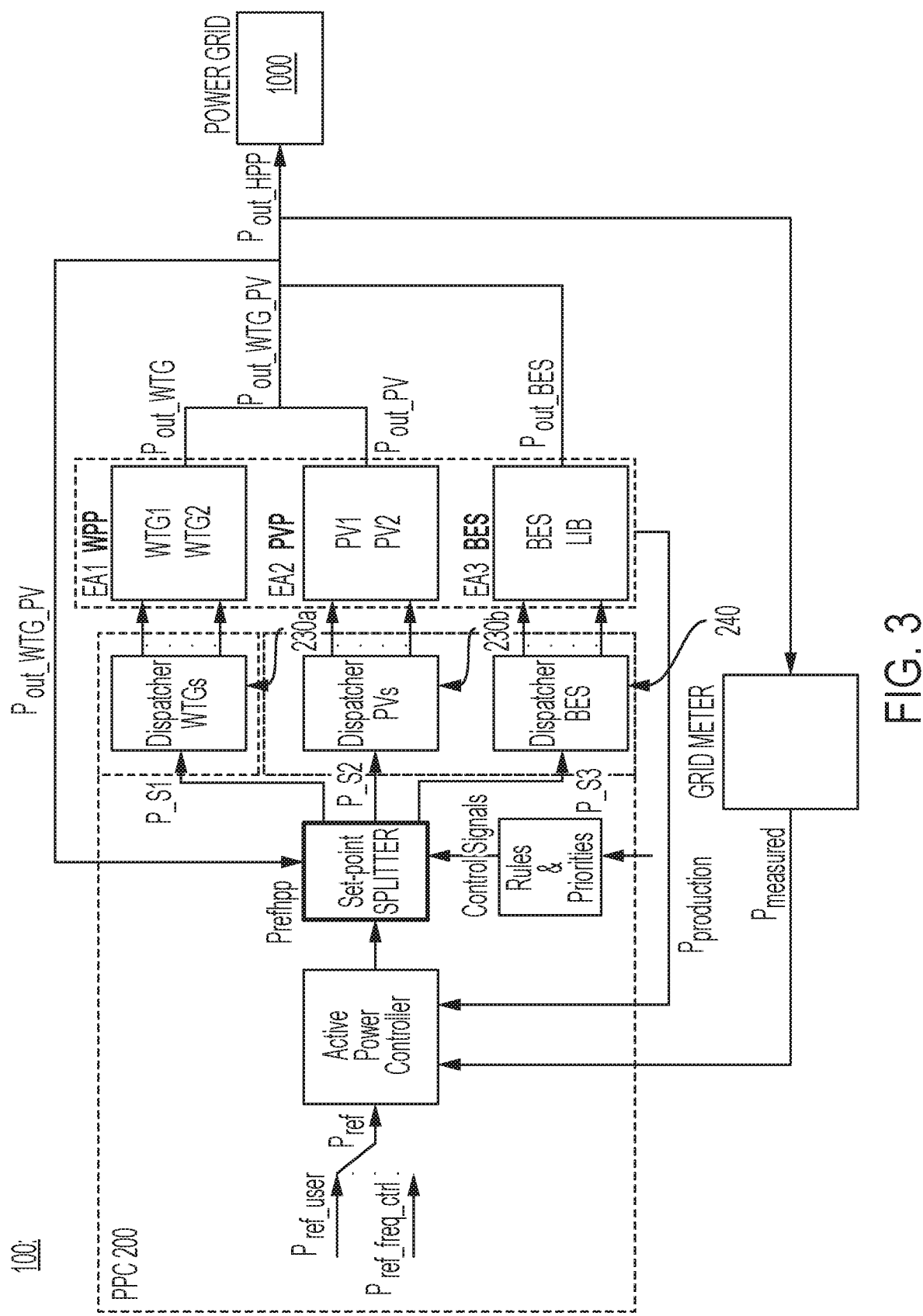
FIG. 3 is a schematic drawing of the hybrid power plant according to another embodiment of the present invention.
Figure 4A:
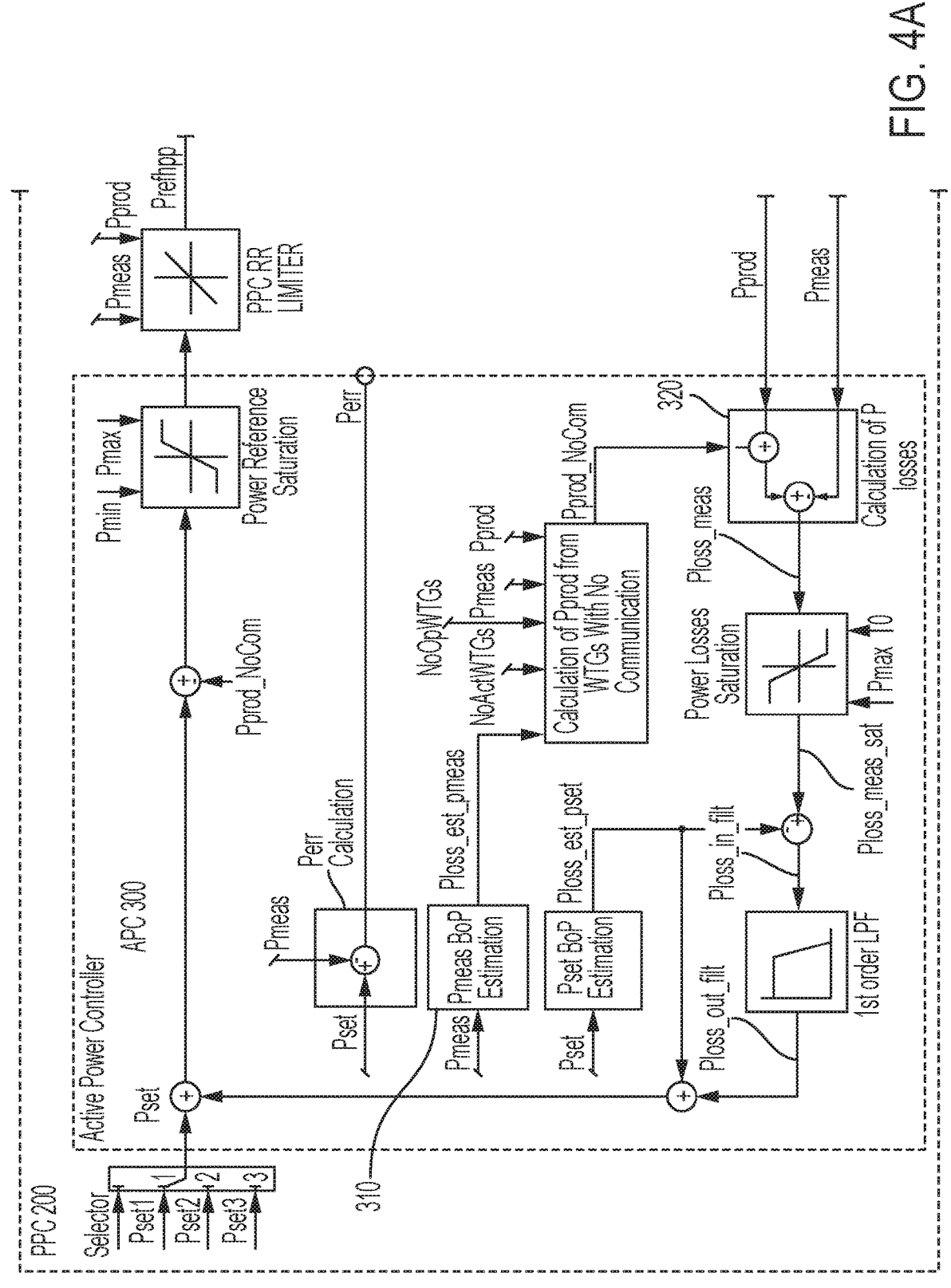
FIG. 4 is a more detailed drawing of the hybrid power plant according to another embodiment of the present invention.
Figure 4B:
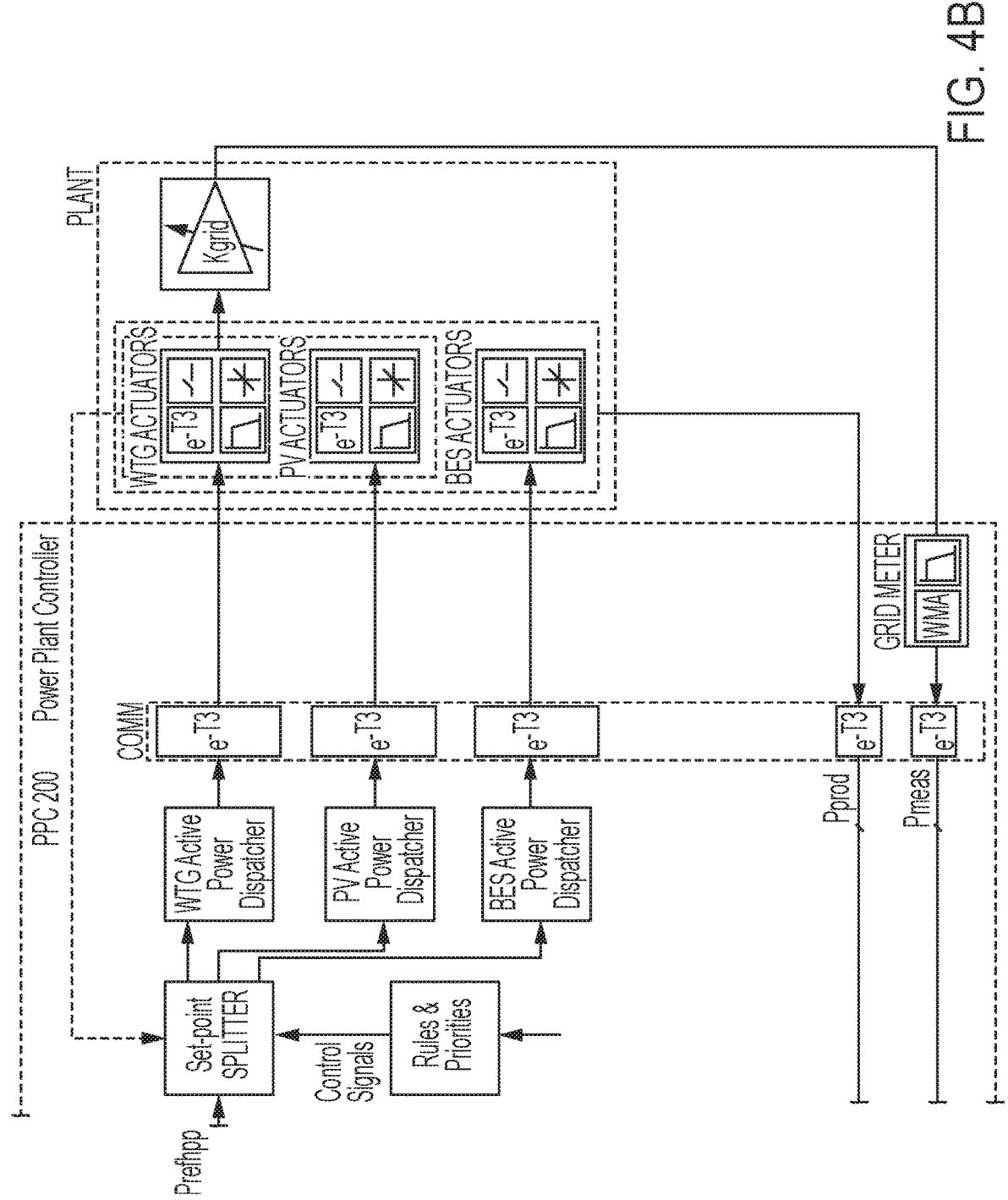

The hybrid power plant 100, cf. FIGS. 3 and 4, comprises a power plant controller PPC 200 arranged to communicate with the plurality of energy assets (not shown in FIG. 1), the power plant controller being arranged for receiving an active power reference P_REF,ext, preferably from a transmission system operator (TSO), and, using a hybrid active power controller 210, calculates a hybrid power plant reference PrefHpp based on for example a desired mode of operation like Frequency Control, Active power curtailment, etc. of the hybrid power plant.

The power plant controller (PPC), 200 is further arranged, in response to a first comparison, for distributing set points PrefPGS, PS_1, PS_2, and particularly Pset1 ... Pset,n, to the first renewable power generating unit and the second renewable power generating unit, and distributing one, or more, corresponding set points, PS_3, PrefESS, more particularly Pset,ess1 ... Pset,essn, to the energy storage unit ESU, cf. FIGS. 3-4, so as to deliver power from the hybrid power plant in accordance with the received active power reference P_REF,ext, which is transformed into PrefHpp as shown in FIG. 1. A hybrid dispatcher 220 receives the PrefHpp control signal and calculates a PrefPGS control signal for the power generating units, and a PrefESS control signal for the energy storage unit or system ESS. At the next level the PrefPGS signal is then distributed, or dispatched, using via a PGS dispatcher 230 to the individual power generating units, e.g. WTGs or PVs. Likewise, the PrefESS signal is then distributed, or dispatched, using via an ESS dispatcher 240 to the energy storage unit in a lower level, e.g. a plurality of batteries.

Figure 2:
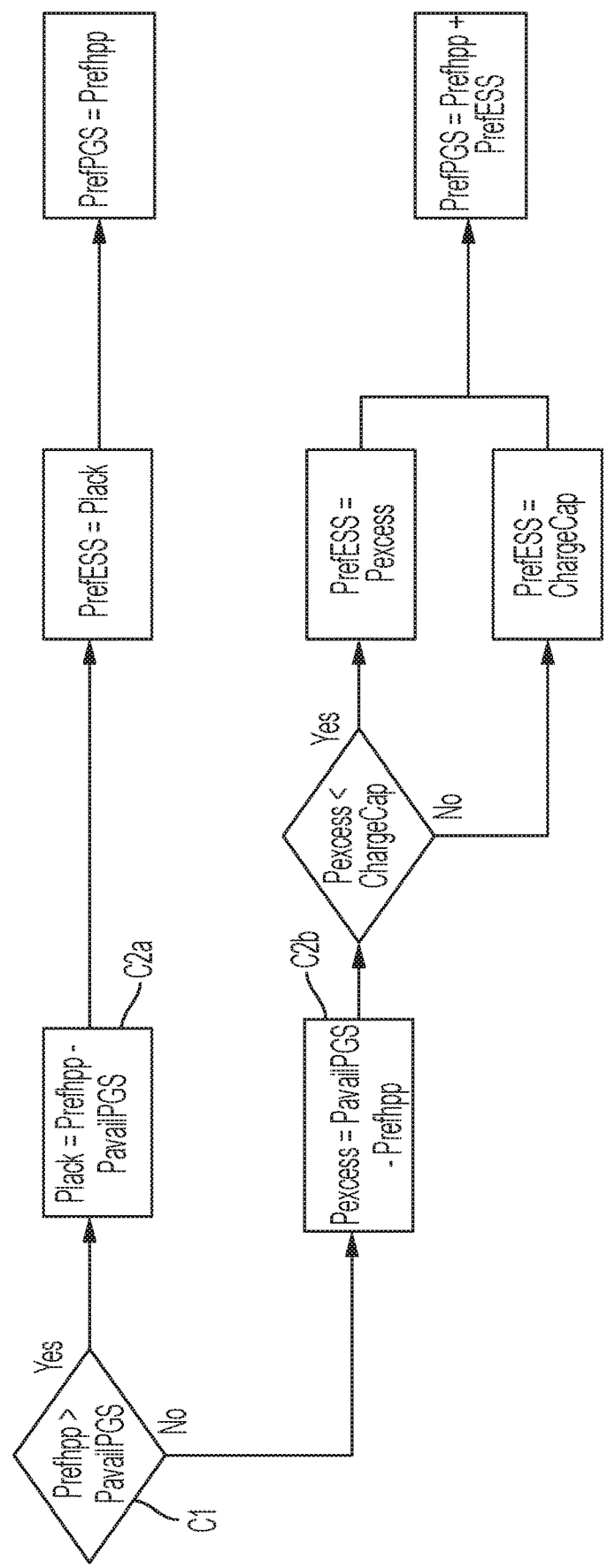
FIG. 2 is a schematic flow-chart representing an out-line of the present invention.

FIG. 2 is a schematic flow-chart representing an out-line of the present invention.

The power plant controller 200 is arranged for performing a first comparison C1 of the said hybrid power plant reference PrefHpp with an available power PavailPGS, measured and/or estimated, from the first renewable power generating unit EA1, 1RPGU and the second renewable power generating unit EA2, 2RPGU to perform a calculation of whether there is an excess of power, or a lacking power from the power generating units. Whether this is calculated with a plus "+" for excess and a minus "−" for lacking power depends merely on a matter of mathematical convenience, or convention, and does not alter the application and principle of the present invention. Alternatively, only numerical difference may be applied. Essentially, excess power is available when the power available from power generating units is larger than the plant active power reference PrefHpp, as indicated in the flow chart as a lower branch, and, oppositely, a situation of lacking power is occurring when the power available from power generating units is less than the hybrid plant active power reference PrefHpp, as indicated in the flow chart as an upper branch. This is determined in a second comparison resulting in the branches C2a: for lacking power, and C2b for excess power.

Excess Power if excess power from power generating units is available, as much of the excess power as possible will be used to charge the energy storage system ESS(s) or energy storage unit ESU. The actual amount of excess power that will be utilised to charge ESS(s) depends on the present total charging capabilities of the ESS(s). The charging capability 'ChargeCap' of an ESS is dependent on the present state, which is based on feedback information like max, charging power, State of Charge (SoC), etc., and user preference settings like max charging setpoint, charging allowed, reserved for frequency control, etc.

If the total charging capabilities is larger than the excess power then all excess power is used for charging. If the total charging capability is less than the excess power then the excess power utilised for charging will be limited to the charging capability.

In case of for example multiple BESs, the distribution of set points Pset,ess for the individual BES is done based on user specified setting like priority, percentage weighting, charging capability share, State of Charge, etc.

The charging set point might be overruled by a manual charging request that exceeds the excess power, which means that the hybrid plant active power reference cannot be met. This is in order to allow the user to force charging on an ESS, for instance when the price of power is low.

Lacking Power

If power from power generating systems is lacking then the lacking power will be covered by discharging the ESS to the extent possible. The actual amount of lacking power that will be covered by discharging ESS(s) depends on the present total discharging capabilities of ESS(s). The discharging capability of an ESS is dependent on its present state, which is based on feedback information like max, discharging power, State of Charge, etc., and user preference settings like max discharging set point, discharging allowed, reserved for F-Ctrl, etc. If the total discharging capabilities is larger than the lacking power then all lacking power is covered by discharging. If the total discharging capability is less than the lacking power then all discharging capability will be used. In case of multiple ESS, the distribution of SP for the individual ESS is done based on user specified setting like priority, percentage weighting, charging capability share, State of Charge, etc.

In case of excess power was available and used for charging, the total charging set point will indicate the requested charging due to excess power, and must then be added to the plant active power reference:

PrefPGS=PrefHpp+PrefESS

In case no charging set point was set (due to lacking power i.e. in the upper branch of the flow chart), the plant active power set point will just be distributed:

PrefPGS=PrefHpp

This is to allow the first and second power generating units to produce power up to PrefHpp whenever possible, since it may not be desirable to discharge the ESS(s) more than necessary. PrefPGS is then the reference that must be covered by to the Power Generating units or Systems. In case of multiple power generating units, the distribution of set points for the individual power generating units is done based on user specified settings like priority, percentage weighting, available power weighting, etc. Additionally, or alternatively, the set points may be limited due to other circumstances such as limits on rated power.

FIG. 3 is a schematic drawing of the hybrid power plant according to another embodiment of the present invention. The hybrid power plant 100 is connected to associated electrical grid 1000 for producing power to the electrical grid, the hybrid power plant comprising a plurality of energy assets EA1, EA2 and EA3.

Thus, a first renewable power generating unit EA1 or 1RPGU is part of the plant 100, i.e. in this embodiment a plurality of wind turbine generators, WTG1 and WTG2, and a second renewable power generating unit, EA2, 2RPGU, i.e. in this embodiment a plurality of solar power units, PV1 and PV2, For simplicity, only two wind turbine generators and solar power units are indicated in this embodiment, but of course the skilled person would understand that any number of renewable power generating units is in principle contemplated within the teaching and principle of the present invention.

Additionally, an energy storage unit ESU or system ESS, is part of the plant 100, preferably a battery energy storage system BES, which is capable of storing energy from said first and second renewable power generating units, i.e. from the wind turbine generators, WTG1 and WTG2, and solar power unit, PV1 and PV2, and the energy storage unit being arranged for delivering power to said electrical grid 1000 when required. The energy storage unit is indicated as the third energy asset EA3.

The hybrid power plant 100 further comprises a power plant controller (PPC) 200 arranged to communicate with the plurality of energy assets, i.e. receive information about their state/condition and generally send control signals to each of them, and the power plant controller is particularly arranged for receiving an active power reference (as indicated to the left of the PPC), for example provided by a grid operator, and correspondingly distribute active power set points, P_S1, P_S2, and P_S3 to the plurality of energy assets as shown in FIGS. 1 and 3. As an intermediate control signal hybrid power plant reference Prefhpp is also used. It may be mentioned that in some embodiments, the WTG Dispatcher may form part of the controller PPC 200. The P_REF is the reference received either from the grid operator (TSO) i.e. Pref,ext in FIG. 1, or a user, but it can also be from another controller—such as Frequency Controller as indicated by the signal name Pref_freq_ctrl. The power plant controller 200 may comprise wind turbine generator WTG dispatcher 230*a*, PV dispatcher 230*b*, and BES dispatcher 240, as schematically indicated in FIG. 3.

In general it is expected that the PPC 200 will communicate directly with the WTG1 and WTG2, and it will communicate to the energy storage BES and PV1 and PV2 through dedicated BES and PV controllers (similar to a power plant controller PPC but specifically for PV and BES). These dedicated controllers will then distribute the set-point to individual PV array converters or individual ES converters (i.e, the PV and ES systems are composed of a plurality of units, just as the wind power plant system). In the shown embodiment, the controller PPC 200 communicates via a Set-point SPLITTER, the Set-point SPLITTER then dispatches set point PS_1, PS_2 and PS_3 further to a dispatcher for each energy assets.

It is also contemplated that it is possible to distribute set points to WTGs through local controllers. That is one master PPC distributes set-points to one/more slave PPC, for example for large wind turbine parks with a large number of wind turbine generators, such as more than 20 wind turbine generators, or more than 40 wind turbine generators.

FIG. 4 is a more detailed drawing of the hybrid power plant according to another embodiment of the present invention. FIG. 4 (both 4A and 4B) is a schematic drawing of the hybrid power plant according to another embodiment of the present invention, Thus, in addition to the hybrid power plant shown in FIG. 3, the hybrid power plant 100 further comprises particularly a module 310 for deriving an estimated value for electrical losses in the hybrid power plant. Moreover, a module 320 is present for deriving a measured value for electrical losses in the hybrid power plant, based on a difference between an aggregated power production Pprod from the plurality of energy assets, here EA1 being WTG actuators, EA2 being PV actuators, and EA3 being BES actuators, and a power measurement Pmeas at a point of common coupling (PoC) with the grid 1000. In addition, the power plant controller comprises a regulator 300 being an active power controller arranged to apply this estimated value for electrical losses and the measured value for electrical losses in an active power control loop in the power plant controller 200, the active power control loop being arranged to control an active power production of the hybrid power plant 100 at the point of common coupling.

FIG. 5 is schematic graph of the energy assets during a situation with excess power.

Figure 5A:
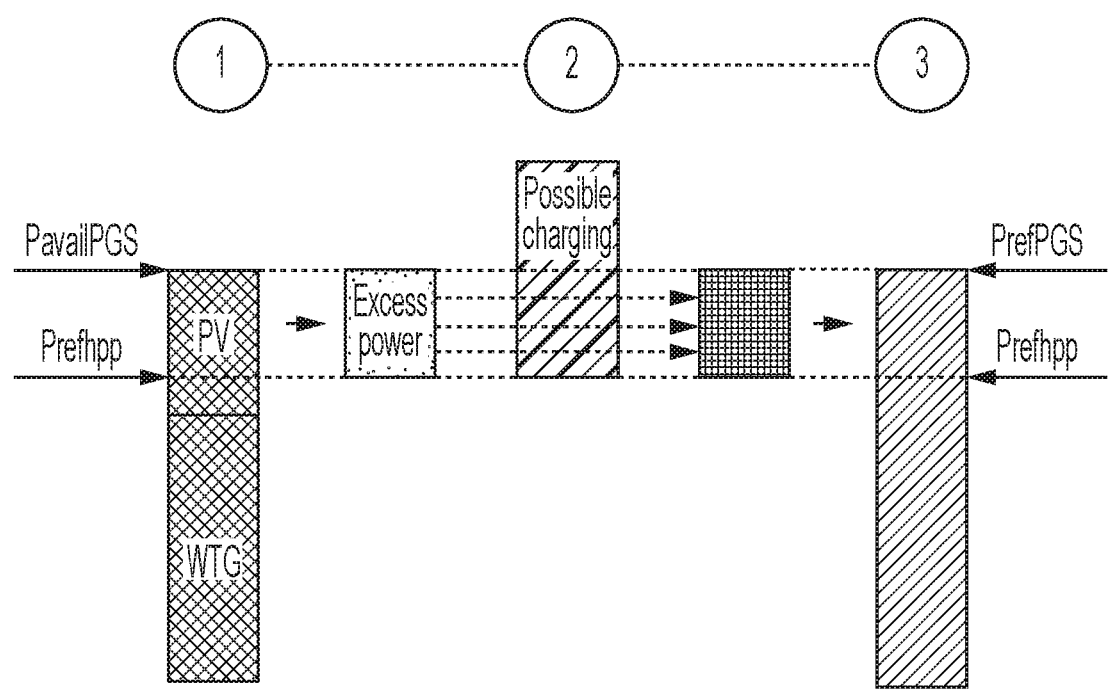
FIG. 5 is schematic graph of the energy assets during a situation with excess power.

Thus, in FIG. 5A there is initially performed a comparison, as indicated by encircled 1, in order to of established if the active power reference P_REF,ext, or more specifically the hybrid power plant reference Prefhpp, is larger or smaller than the available power PavailPGS from the first renewable power generating unit EA1, 1RPGU and the second renewable power generating unit EA2, 2RPGU, cf. FIGS. 3 and 4. In this situation, the available power PavailPGS is seen to be larger and the excess power can be then be stored to the extent possible. In FIG. 5A, a second comparison, as indicated by encircled 2, of available charging, or discharging, capability, for example indicated by a state of charge of the energy storage unit EA3, ESU is made with the result of the first comparison, i.e. the excess power, indicates that the possible charging of the energy storage unit is above the excess power, and hence all of the excess power can therefore be stored for later. Thus, the excess power from the first renewable power generating unit and the second renewable power generating unit will be stored as indicated schematically in the right most column in FIG. 5A.

Figure 5B:
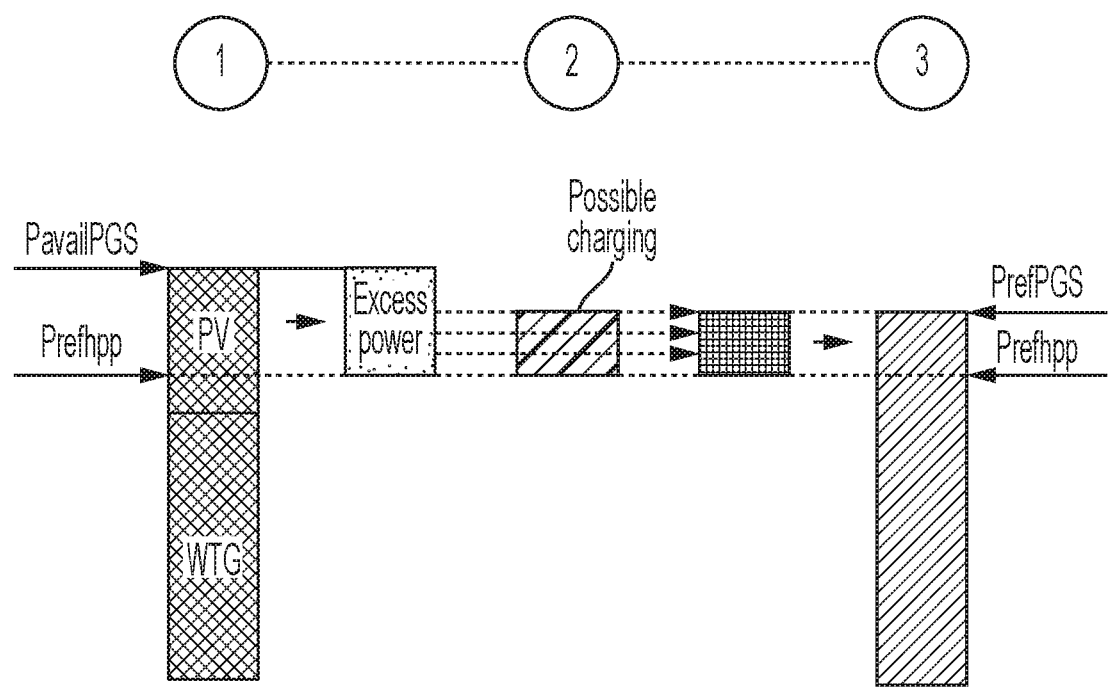

In another situation, as illustrated in FIG. 5B, there is initially performed a comparison, as indicated below the encircled 1, in order to of established if the active power reference P_REF,ext, or more specifically the hybrid power plant reference Prefhpp, is larger or smaller than the available power PavailPGS from the first renewable power generating unit EA1, 1RPGU and the second renewable power generating unit EA2, 2RPGU, cf, FIGS. 3 and 4, In this situation, the available power PavailPGS is again seen to be larger and some of the excess power can be then be stored. In FIG. 58, a second comparison is again made of available charging, or discharging, capability, for example state of charge of the energy storage unit EA3, ESU with the result of the first comparison, i.e. the excess power, indicating that the possible charging of the energy storage unit is below the excess power, and hence only a limited amount of the excess power can therefore be stored for later.

Thus, a limited amount of excess power from the first renewable power generating unit and the second renewable power generating unit will be stored as indicated schematically in the right most column in FIG. 5B, Thus, the power plant controller PPC 200 will then be distributing set points PrefPGS, PS2 to said first renewable power generating unit EA1, 1RPGU and said second renewable power generating unit EA2, 2RPGU, respectively, so as to deliver power from the hybrid power plant in accordance with the received active power reference, P_REF,ext or Prefhpp, the PrefPGS control signal being below the available power PavailPGS, as schematically indicated.

Figure 6A:
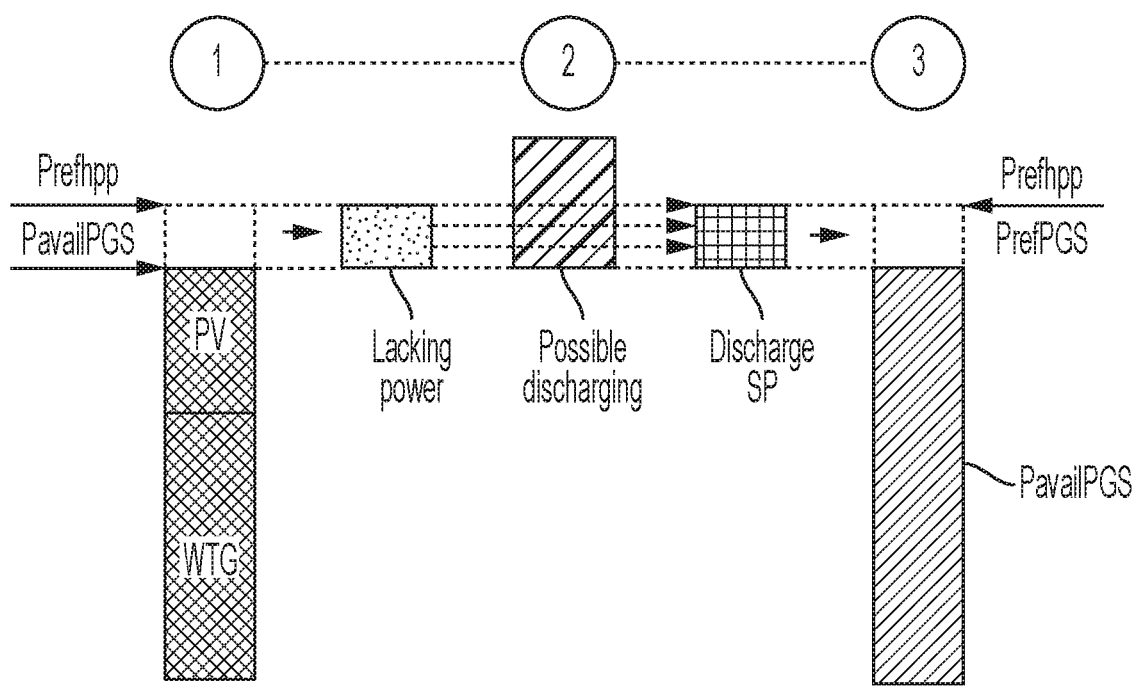
FIG. 6 is schematic graph of the energy assets during a situation with lacking power.
Figure 6B:
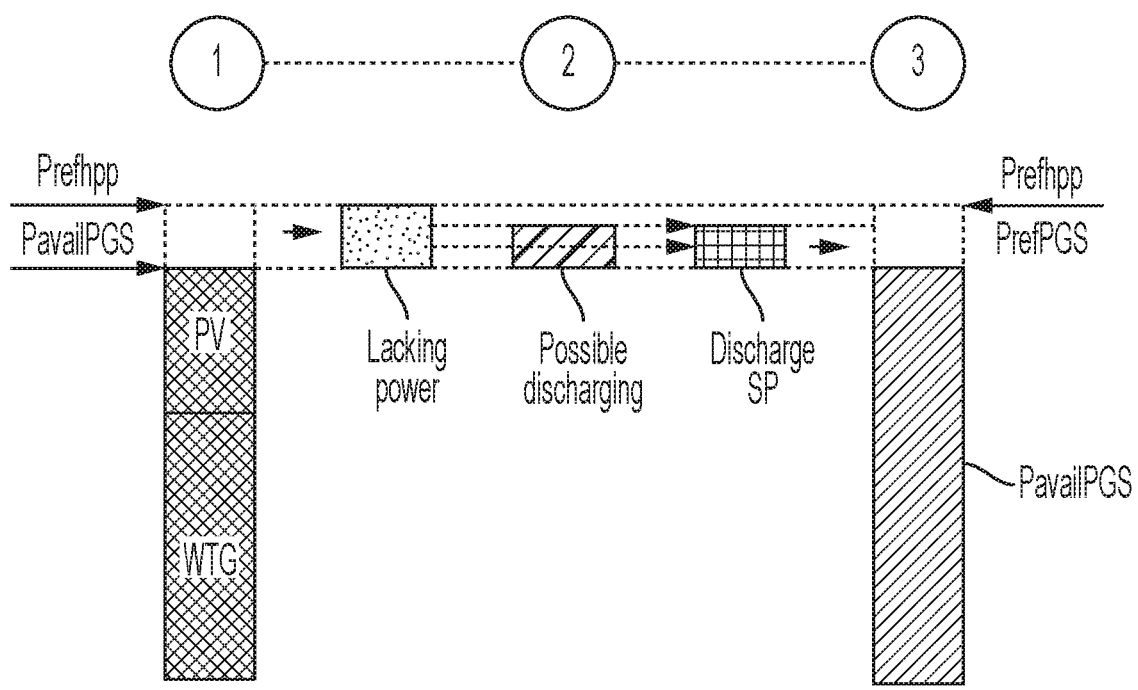

FIG. 6 is schematic graph of the energy assets during a situation with lacking power similar to the graph in FIG. 5, Thus, in FIG. 6A and 66 there is initially performed a comparison, as indicated below the encircled 1, in order to of established if the active power reference P_REF,ext, or more specifically the hybrid power plant reference Prefhpp, is larger or smaller than the available power PavailPGS from the first renewable power generating unit EA1, 1RPGU and the second renewable power generating unit EA2, 2RPGU, cf. FIGS. 3 and 4. However, in both FIGS. 6A and 6B, there is lacking power situation where the available power is below the desired demand for power as represented by the control signal Prefhpp.

In FIG. 6A, the second comparison is again made of available state of charge of the energy storage unit EA3, ESU with the result of the first comparison, i.e. the lacking power, indicating that the possible discharging of the energy storage unit is numerically larger than the lack of power, as indicated below the encircled 2. Thus, by discharging the ESU, it will be possible to close this gap of power by correspondingly discharging the ESU to produce the required power Prefhpp from the hybrid power plant. In a particularly advantageous embodiment of the present invention, the set point of the power generating systems PrefPGS is however set equal, or a predetermined amount below, for example 10%, 20%, 30%, 40% or 50%, to the Prefhpp level to produce more power than required, and/or possibly in a more stable manner.

In FIG. 6B, the second comparison indicates that the possible discharging of the energy storage unit ESU is numerically smaller than the lack of power, as indicated below the encircled 2. Thus, even though the energy storage unit is discharging to the maximum extent possible, there is not produced enough from the hybrid power plant. In another particularly advantageous embodiment of the present invention, the set point of the power generating systems PrefPGS is however set equal, or a predetermined amount below, for example 10%, 20%, 30%, 40% or 50%, to the Prefhpp to produce more power than required, and possibly in a more stable manner.

Figure 7:
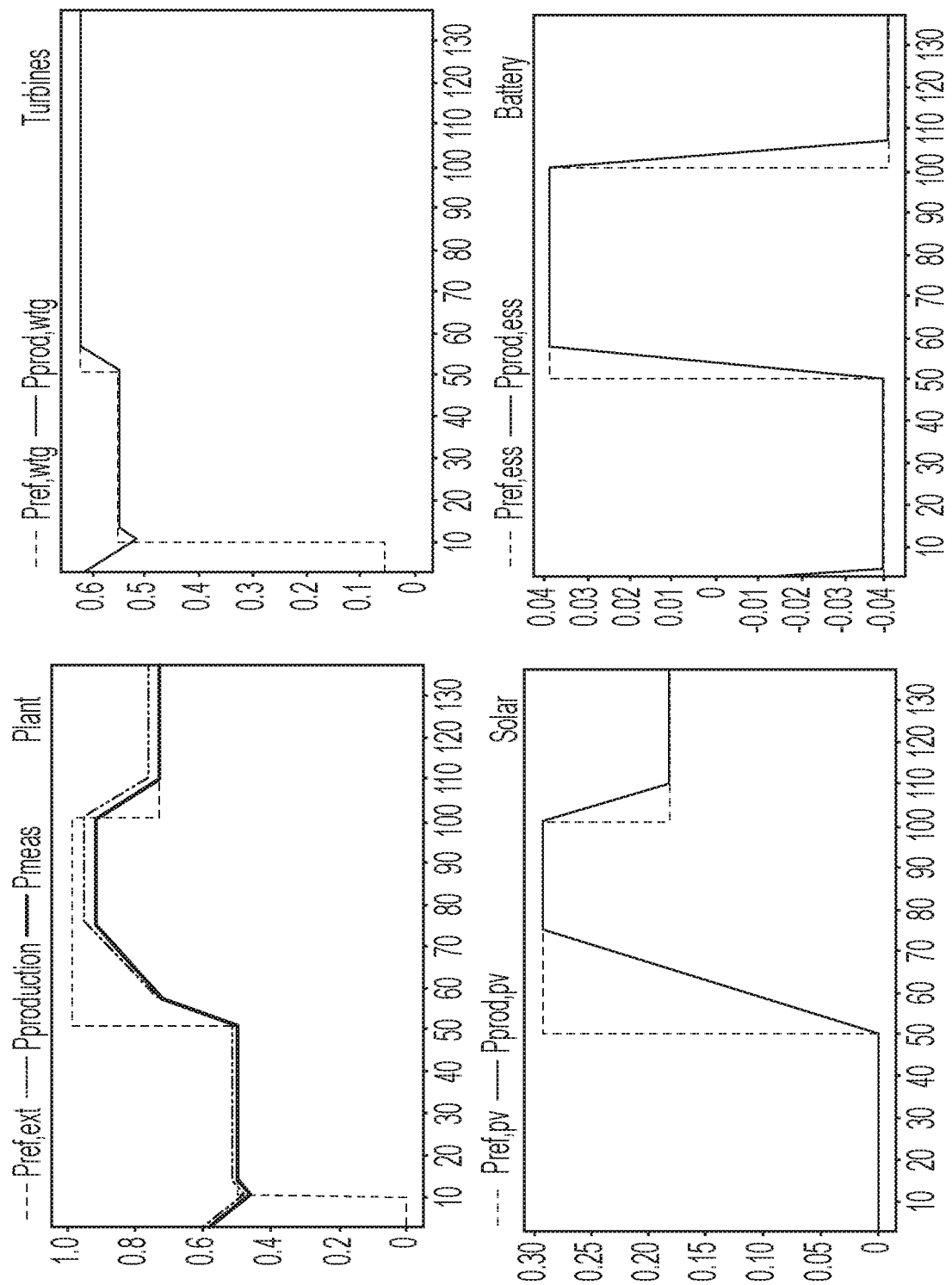
FIGS. 7-9 show simulated graphs of three different situations, called Use Case 1, 2 and 3, of the hybrid power plant according to the present invention.
Figure 8:
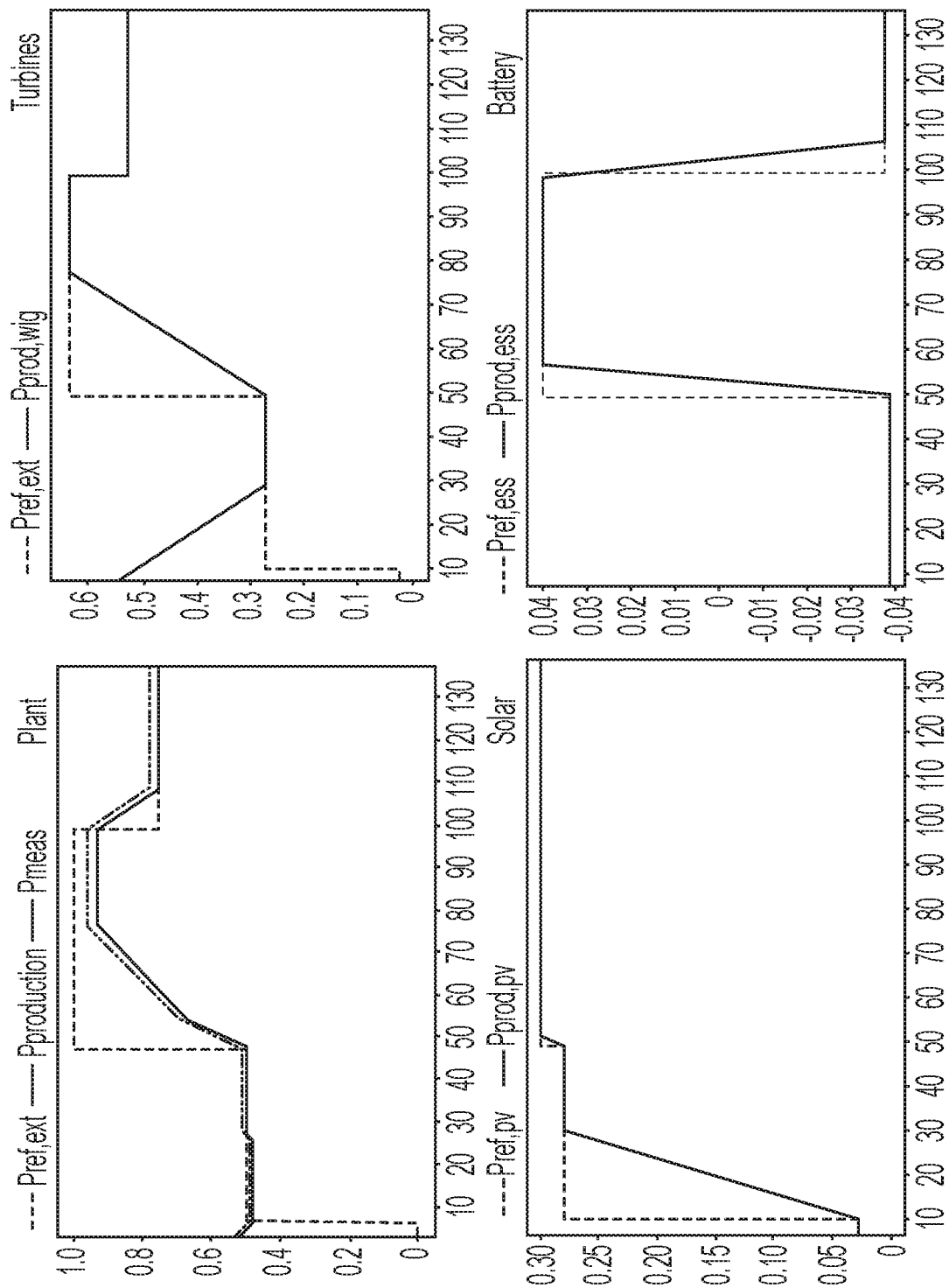
Figure 9:
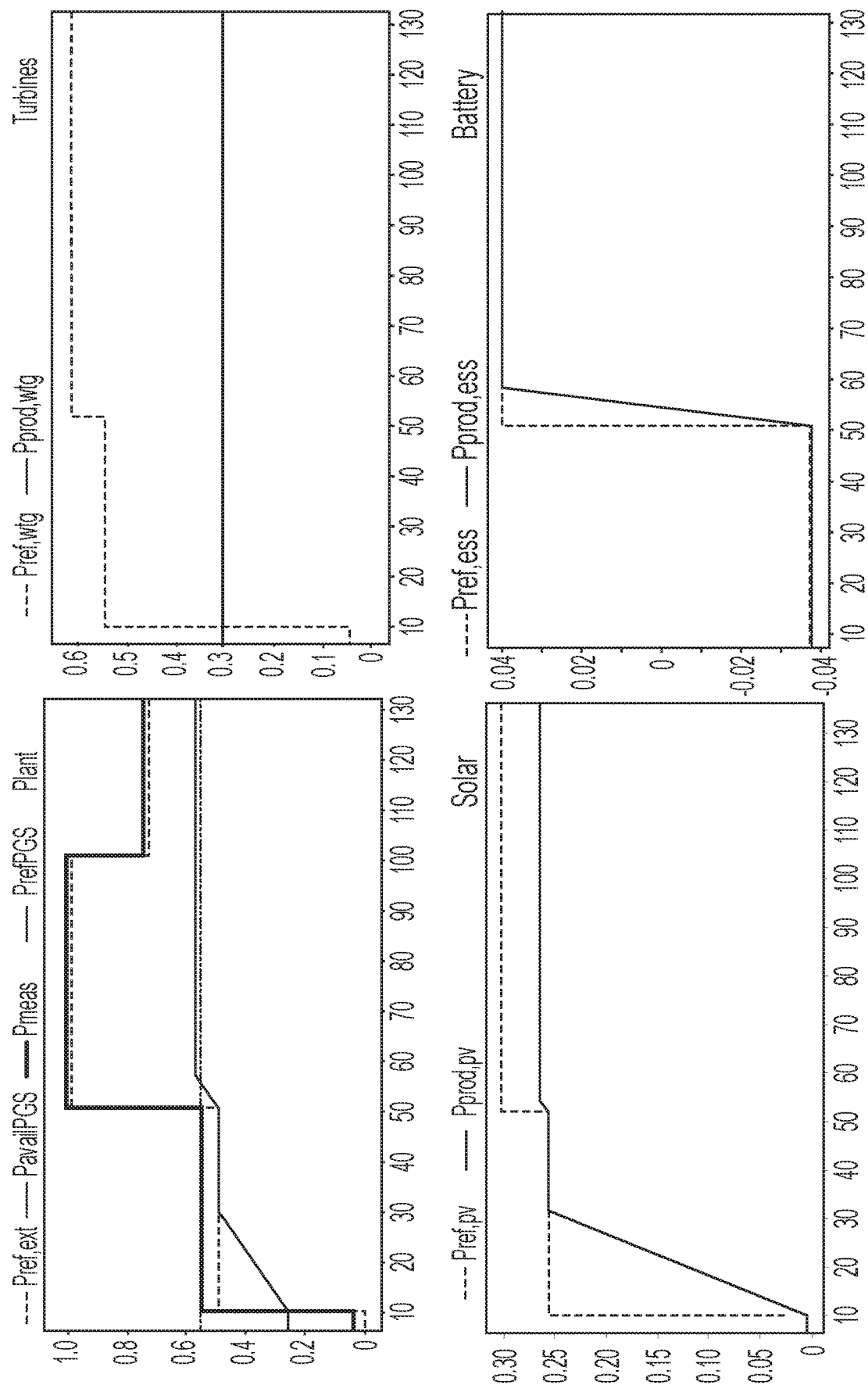

FIGS. 7-9 shows simulated graphs of three different situations, called Use Case 1, 2 and 3, of the hybrid power plant 100 according to the present invention. The vertical axis is arbitrary power units (p.u.) and the horizontal axis is measuring time in seconds.

FIG. 7 'Use Case 1' shows dispatching between hybrid energy assets of wind turbine generators 'Turbines', solar power units 'PV' and energy storage 'Battery', where wind turbine generators are prioritized over the solar power units. Initially, the power plant controller transmits a set point around 0.55 p.u. at a time around 10 second where the hybrid power plant starts to deliver power to the grid (Pref,ext above zero p.u.). At the later time around 50 seconds, the hybrid power plant receives a Pext,reU of around 1 p.u., i.e. the total power production should increase to a higher level. The power plant controller PPC then distributes a set point of around 0.6 p.u. to the wind turbine generators (cf, sub graph 'Turbines'), and the WTGs are seen to react within a few seconds this new set point. At the same time, the PV units (cf. sub graph 'Solar') are ramping up from not producing any power to a level just below 0.3 p.u. The PV units are seen to ramp up in slower way relative to the WTGS, i.e. the PV units require around 25 seconds before they reach the desired set point. At around 50 seconds, the energy storage unit (cf. sub graph 'Battery') changes from a negative power production of around −0.4 p.u., i.e. the batteries are being charged due to the excess of power, to a situation where the batteries delivers just below 0.04 p.u. to the total power production from the hybrid power plant. The overall power production, Pmeas, of the hybrid power plant (cf. sub graph 'Plant') is seen to respond relatively quickly to the required changes in the external active power reference, Pref,ext, even though the various energy assets having different response characteristics as FIG. 7 shows.

FIG. 8 is situation similar to FIG. 7, but instead the dispatching between the various energy assets of wind turbine generators 'Turbines' and solar power units 'Solar' being weighted equally (50%), Thus, initially the WTGs (cf. sub graph 'Turbines') produce around from around 0.55 p.u. falling to just below 0.3 p.u. and around a time of 50 seconds the wind turbine generators ramp up to power production of around 0.6 p.u., while at the same time the PV units increase from around 0.25 p.u. to just below 0.3 p.u. and the energy storage unit (cf. sub graph 'Battery') changes again from a negative power production of around −0.4 p.u., i.e. the batteries are being charged, to a situation where the batteries delivers just below 0.04 p.u. by being discharged accordingly.

FIG. 9 is a situation, where there is initially an excess of power and the batteries (cf. sub graph 'Battery') are being charged i.e. negative power production of around −0.4 p.u. Later, another situation at around 50 seconds arises, where the hybrid power plant cannot fully deliver the required power as expressed by the received Pref,ext signal as compared to PavailPGS and the discharge capability of the energy storage unit of around 0.04 p.u., thus, there is a lack of power from the hybrid power plant. Nevertheless, the full reference PrefPGS is sent, or dispatched, to power generating systems (cf. sub graphs 'Turbines' and 'Solar'), even though they have limited available power PavailPGS. Thus, by dispatching such set points or control signals to the power generating systems, more power than considered available is actually produced, the reason being related to the difficulties of reliably estimating or measuring the available power from the power generating systems being based on renewable energy. This is a particularly advantageous embodiment of the invention harvesting more power from the hybrid power plant than expected as seen by the Pmeas being above the PavailPGS and Pprod,ess, even though the desired power Pref,ext cannot be fully produced after 50 seconds.

Figure 10:
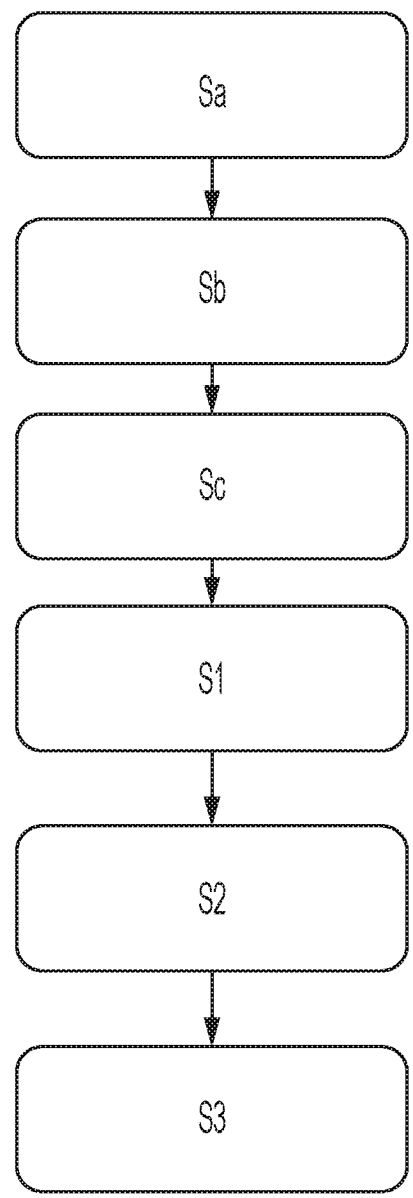
FIG. 10 is a schematic system-chart representing an out-line of/in detail the operations of the computer program product according to the invention or a method according to the invention.

FIG. 10 is a schematic system-chart representing an out-line of/in detail the operations of the computer program product according to the invention or a method according to the invention. Thus, a method for controlling a hybrid power plant, the hybrid power plant 100 being connected to an electrical grid 1000 for producing power to said electrical grid, the hybrid power plant comprising a plurality of energy assets, the plurality of energy assets, EA1, EA2, and EA3 cf. FIGS. 3 and 4, comprising:

Sa a first renewable power generating unit EA1, 1RPGU, said first renewable power generating unit comprises a plurality of wind turbine generators WTG1, WTG2, Sb a second renewable power generating unit EA2, 2RPGU, wherein the second renewable power generating unit being different from first renewable power generating unit, preferably said second renewable power generating unit comprises a plurality of solar power units PV1, PV2, and Sc an energy storage unit EA3, ESU, preferably a battery energy storage system BES, said energy storage unit being capable of storing energy from said first and second renewable power generating units, and delivering power to said electrical grid when required, wherein the method comprises:

S1 controlling a power plant controller (PPC) 200 to communicate with the plurality of energy assets, the power plant controller being arranged for receiving an active power reference P_REF,ext, Prefhpp, S2 performing a first comparison C1 of said active power reference, P_REF,ext or Prefhpp, with an available power PavailPGS from said first renewable power generating unit EA1, 1RPGU and said second renewable power generating unit EA2, 2RPGU, cf. FIG. 2, S3 performing a second comparison C2a, C2b of available charging, or discharging, capability of the energy storage unit EA3, ESU with said first comparison, and distributing a corresponding set point PS_3, PrefESS to said energy storage unit EA3, ESU, and In summary, the invention relates to a hybrid power plant 100 for producing power to the electrical grid, the hybrid power plant comprising a plurality of energy assets; a first renewable power generating unit, such as wind turbine generators WTG1, WTG2, a second renewable power generating unit, such as a plurality of solar power units PV1, PV2, and an energy storage unit, such as a battery energy storage system BES. A power plant controller PPC, 200 is arranged to perform a first comparison C1 of an active power reference P_REF,ext, Prefhpp with an available power PavailPGS from the first and the second renewable power generating units and performing a second comparison C2 of available charging, or discharging, capability of the energy storage unit with said first comparison, cf. FIGS. 1 and 2. In response to this first comparison, there are distributed set points PrefPGS to the first and the second renewable power generating units so as to deliver power from the hybrid power plant in accordance with the received active power reference P_REF,ext or Prefhpp, cf. FIGS. 3 and 4.

The invention can be implemented by means of hardware, software, firmware or any combination of these. The invention or some of the features thereof can also be implemented as software running on one or more data processors and/or digital signal processors.

The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc, should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A hybrid power plant connected to an associated electrical grid for producing power to said electrical grid, the hybrid power plant comprising a plurality of energy assets, the plurality of energy assets comprising:
   a first renewable power generating unit, said first renewable power generating unit comprises a plurality of wind turbine generators,
   a second renewable power generating unit, wherein the second renewable power generating unit is different from the first renewable power generating unit, and
   an energy storage unit, said energy storage unit being capable of storing energy from said first and second renewable power generating units, and delivering power to said electrical grid when required,
   wherein the hybrid power plant further comprises a power plant controller arranged to communicate with the plurality of energy assets, the power plant controller being arranged for
   receiving an active power reference and performing a first comparison of said active power reference with an available power from said first renewable power generating unit and said second renewable power generating unit, wherein the available power is defined by power which a given renewable power generating unit is able to produce, and
   performing a second comparison of an available charging, or discharging, capability of the energy storage unit with a result of said first comparison, and distributing a corresponding set point to said energy storage unit, and
   the power plant controller further being arranged, in response to the result of said first comparison, for distributing set points to said first renewable power generating unit and said second renewable power generating unit, respectively,
   so as to deliver power from the hybrid power plant in accordance with the received active power reference, and
   wherein the power plant controller is further arranged for distributing set points to at least one of said first renewable power generating unit and said second renewable power generating unit, respectively, that are above the available power from said first renewable power generating unit and said second renewable power generating unit.

2. The hybrid power plant according to claim 1, wherein, when said first comparison of said active power reference with the available power results in said active power reference being larger than the available power indicating a lack of power, the power plant controller, depending on the second comparison, is arranged for distributing a corresponding set point to the energy storage unit for, at least partly, compensating said lack of power by discharging the energy storage unit.

3. The hybrid power plant according to claim 2, wherein a result of said second comparison indicates that the available charging, or discharging, capability from the energy storage unit is sufficient for compensating the lack of power indicated by the first comparison, and the power plant controller is arranged for distributing a corresponding set point to said energy storage unit.

4. The hybrid power plant according to claim 2, wherein a result of said second comparison indicates that the available charging, or discharging, capability from the energy storage unit is not sufficient for compensating the lack of power indicated by the first comparison, and the power plant controller is arranged for distributing a corresponding set point to said energy storage unit for compensating the lack of power to an extent possible by the available charging, or discharging, capability.

5. The hybrid power plant according to claim 1, wherein the set points above the available power are independent of said second comparison.

6. The hybrid power plant according to claim 5, wherein the set points to at least one of said first renewable power generating unit and said second renewable power generating unit, respectively, are equal to the active power reference.

7. The hybrid power plant according to claim 1, wherein, when said first comparison of said active power reference with the available power results in said active power reference being smaller than the available power indicating an excess of power, the power plant controller, depending on a result of the second comparison, is arranged for distributing a corresponding set point to the energy storage unit for charging the energy storage unit to an extent possible.

8. The hybrid power plant according to claim 7, wherein the power plant controller, depending on the result of the second comparison, is arranged for distributing a corresponding set point to the energy storage unit for charging the energy storage unit with a full, or a partly, charging capability of the energy storage unit, and for distributing corresponding set points to said first renewable power generating unit and said second renewable power generating unit, respectively.

9. The hybrid power plant according to claim 7, wherein the power plant controller is further arranged, in response to the result of said second comparison, for distributing set points to said first renewable power generating unit and said second renewable power generating unit, respectively, so as to deliver power from the hybrid power plant in accordance with the received active power reference.

10. The hybrid power plant according to claim 1, wherein the power plant controller is arranged for receiving the active power reference, and, using a hybrid active power controller, calculates a hybrid power plant reference based on a desired mode of operation of the hybrid power plant, and the power plant controller being arranged for performing said first comparison of said hybrid power plant reference with the available power from said first renewable power generating unit and said second renewable power generating unit.

11. The hybrid power plant according to claim 1, wherein the available power from said first renewable power generating unit and said second renewable power generating unit is, at least partly, based on at least one of a meteorological condition, a forecast for a wind condition, a forecast for said first renewable power generating unit, and a forecast for said second renewable power generating unit.

12. The hybrid power plant according to claim 1, the hybrid power plant further comprises:
  a module for deriving an estimated value for electrical losses in the hybrid power plant;
  a module for deriving a measured value for electrical losses in the hybrid power plant, based on a difference between an aggregated power production from the plurality of energy assets and a power measurement at a point of common coupling; and
  a regulator arranged to apply the estimated value for electrical losses and the measured value for electrical losses in an active power control loop in the power plant controller, the active power control loop being arranged to control an active power production of the hybrid power plant at the point of common coupling, and
  wherein the available power from said first renewable power generating unit and said second renewable power generating unit is calculated using said regulator.

13. A method for controlling a hybrid power plant, the hybrid power plant being connected to an electrical grid for producing power to said electrical grid, the hybrid power plant comprising a plurality of energy assets, the plurality of energy assets comprising:
  a first renewable power generating unit, said first renewable power generating unit comprises a plurality of wind turbine generators,
  a second renewable power generating unit, wherein the second renewable power generating unit being different from first renewable power generating unit, and
  an energy storage unit, said energy storage unit being capable of storing energy from said first and second renewable power generating units, and delivering power to said electrical grid when required, wherein the method comprises:
  controlling a power plant controller to communicate with the plurality of energy assets, the power plant controller being arranged for receiving an active power reference,
  performing a first comparison of said active power reference with an available power from said first renewable power generating unit and said second renewable power generating unit, wherein the available power is defined by power which a given renewable power generating unit is able to produce,
  performing a second comparison of an available charging, or discharging, capability of the energy storage unit with a result of said first comparison, and distributing a corresponding set point to said energy storage unit, and
  distributing set points to said first renewable power generating unit and said second renewable power generating unit, respectively, in response to the result of said first comparison, so as to deliver power from the hybrid power plant in accordance with the received active power reference, and
  wherein performing said first comparison of said active power reference with the available power results in said active power reference being smaller than the available power indicating an excess of power available for charging said energy storage unit, and in response to a charging request, the corresponding set point distributed to said energy storage unit is set so that power delivered to the energy storage unit exceeds the excess of power.

14. A power plant controller for controlling an associated hybrid power plant connected to an associated electrical grid for producing power to said electrical grid, the hybrid power plant comprising a plurality of energy assets, the plurality of energy assets comprising:
  a first renewable power generating unit, said first renewable power generating unit comprises a plurality of wind turbine generators,
  a second renewable power generating unit, wherein the second renewable power generating unit being different from said first renewable power generating unit, and
  an energy storage unit, said energy storage unit being capable of storing energy from said first and second renewable power generating units, and delivering power to said electrical grid when required,
  wherein the power plant controller is arranged to communicate with the plurality of energy assets, the power plant controller being arranged for
    receiving an active power reference and performing a first comparison of said active power reference with an available power from said first renewable power generating unit and said second renewable power generating unit, wherein the available power is defined by power which a given renewable power generating unit is able to produce, and
    performing a second comparison of an available charging, or discharging, capability of the energy storage unit with a result of said first comparison, and distributing a corresponding set point to said energy storage unit, and
    the power plant controller further being arranged, in response to the result of said first comparison, for distributing set points to said first renewable power generating unit and said second renewable power generating unit, respectively, so as to deliver power from the hybrid power plant in accordance with the received active power reference, and wherein the power plant controller comprises:
- a module for deriving an estimated value for electrical losses in the hybrid power plant;
- a module for deriving a measured value for electrical losses in the hybrid power plant, based on a difference between an aggregated power production from the plurality of energy assets and a power measurement at a point of common coupling; and
- a regulator arranged to apply the estimated value for electrical losses and the measured value for electrical losses in an active power control loop in the power plant controller, the active power control loop being arranged to control an active power production of the hybrid power plant at the point of common coupling, and
- wherein the available power from said first renewable power generating unit and said second renewable power generating unit is calculated using said regulator.

15. A non-transitory computer readable medium containing a program which, when executed by one or more processors, performs an operation, comprising:
controlling a power plant controller to communicate with a plurality of energy assets of a hybrid power plant, the power plant controller being arranged for receiving an active power reference;
performing a first comparison of said active power reference with an available power from a first renewable power generating unit of the hybrid power plant and a second renewable power generating unit of the hybrid power plant, wherein the available power is defined by power which a given renewable power generating unit is able to produce, wherein the first renewable power generating unit comprises a plurality of wind turbine generators and the second renewable power generating unit comprises a plurality of solar power units;
performing a second comparison of an available charging, or discharging, capability of an energy storage unit with a result of said first comparison, and distributing a corresponding set point to said energy storage unit; said energy storage unit comprising a battery energy storage system, said energy storage unit being capable of storing energy from said first and second renewable power generating units, and delivering power to an electrical grid when required; and
distributing set points to said first renewable power generating unit and said second renewable power generating unit, respectively, in response to the result of said first comparison, so as to deliver power from the hybrid power plant in accordance with the received active power reference, and
wherein the power plant controller is further arranged for distributing set points to at least one of said first renewable power generating unit and said second renewable power generating unit, respectively, that are above the available power from said first renewable power generating unit and said second renewable power generating unit.

16. The hybrid power plant according to claim 1, wherein performing said first comparison of said active power reference with the available power results in said active power reference being smaller than the available power indicating an excess of power available for charging said energy storage unit, and in response to a charging request, the corresponding set point distributed to said energy storage unit is set so that power delivered to the energy storage unit exceeds the excess of power.

17. The hybrid power plant according to claim 1, wherein said second renewable power generating unit comprises a plurality of solar power units.

18. The hybrid power plant according to claim 1, wherein said energy storage unit comprises a battery energy storage system.

* * * * *